United States Patent [19]

Tucker

[11] 4,378,934

[45] Apr. 5, 1983

[54] METHOD AND APPARATUS FOR SALVAGING LARGE PIPE ELBOWS

[76] Inventor: George W. Tucker, Rt. 13, Box 276, Fort Worth, Tex. 76119

[21] Appl. No.: 156,592

[22] Filed: Jun. 5, 1980

[51] Int. Cl.³ .............................................. B23K 7/04
[52] U.S. Cl. ...................................... 266/55; 266/67; 266/68
[58] Field of Search ........................ 266/54, 55, 56, 57, 266/58, 67, 68

[56] References Cited

U.S. PATENT DOCUMENTS

| | | | |
|---|---|---|---|
| 2,622,327 | 12/1952 | Halonen | 266/55 |
| 2,652,243 | 9/1953 | Reed | 266/57 |
| 2,848,215 | 8/1958 | Pendergrass | 266/56 |
| 3,196,722 | 7/1965 | Lewis et al. | 266/55 |
| 3,409,282 | 11/1968 | Livers | 266/58 |
| 3,417,980 | 12/1968 | Greene | 148/9.6 |
| 4,148,467 | 4/1979 | Sargeant | 266/68 |

*Primary Examiner*—John P. Sheehan
*Attorney, Agent, or Firm*—Charles W. McHugh

[57] ABSTRACT

An apparatus is disclosed for re-claiming used or damaged tube turns and rendering them equivalent to new tube turns with correctly oriented openings. A salvaged tube turn is temporarily fixed to a platform in a position such that the longitudinal axis of one of tube turn ends is approximately perpendicular to the plane of an adjacent circular track. The platform is moved so that the opening of the tube turn end is near the circular track. The circular track is then accurately centered with respect to the opening by use of a spider or the like which is temporarily fixed to the center of the track. Either the spider (and track) or the tube turn is moved so that the spider engages the *interior* of the opening. After the tube turn and the circular track have been aligned correctly with respect to both vertical and horizontal axes, the tube turn and track are moved away from each other in a controlled manner along an axis which is perpendicular to the track—in order to provide clearance space for removal of the spider. The tube turn and circular track are subsequently brought back together along the same controlled axis, until they have re-assumed the correct relationship they had earlier. Moving a cutting torch or grinder around the circular track will remove metal from the old opening and will produce a fresh opening which has a known spatial relationship with respect to the tube turn. If necessary, the other end of the tube turn may be similarly cut and/or ground.

10 Claims, 16 Drawing Figures

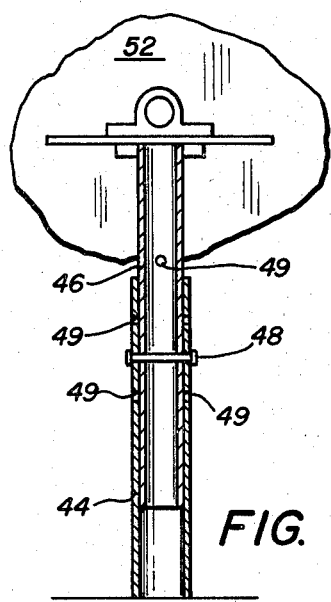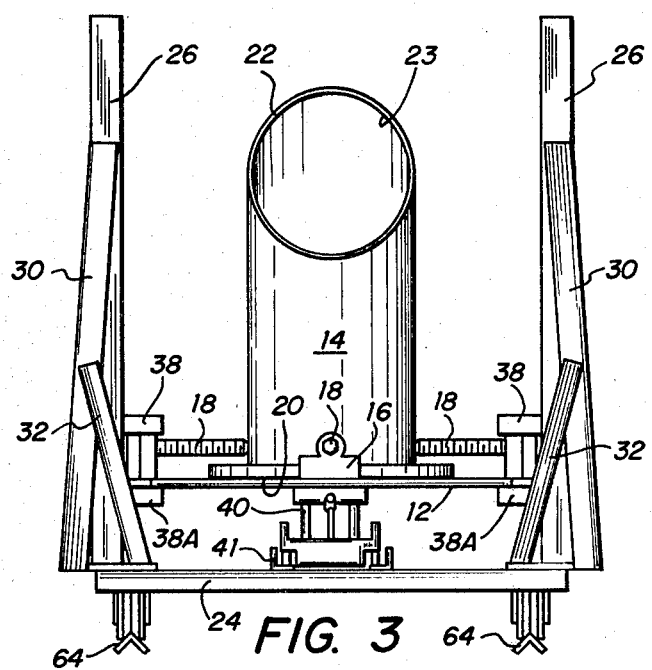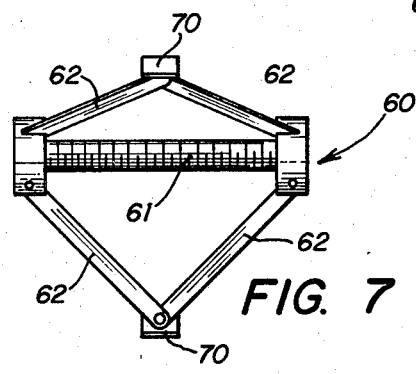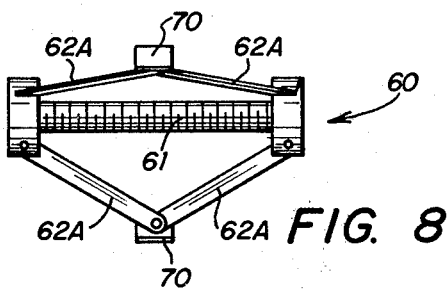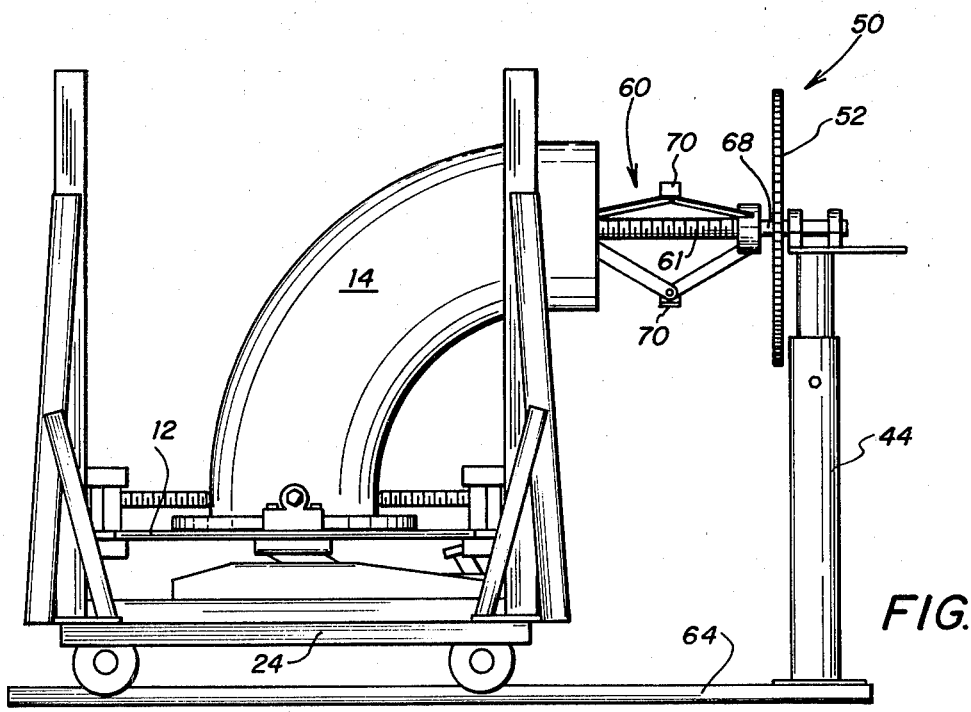

METHOD AND APPARATUS FOR SALVAGING LARGE PIPE ELBOWS

This invention relates generally to machinery for finishing the openings of relatively large pipe elbows, so that the elbows may be welded to another structure; more particularly, it relates to machinery for re-processing used or damaged elbows, in order that they might be salvaged and reused.

There are many occasions when improvements to or expansion of a factory, refinery, chemical plant, etc., require that relatively large steel pipes be relocated or otherwise altered. When such installations have large pipes which must be removed, workmen typically employ cutting torches to sever the connection between straight pipes and any elbows or tube turns that are present. Usually the previously established connections are severed in approximately the same place in which the connections were first created. However, because of the nature of the process of tearing down existing piping, the openings that are made in tube turns by workmen with their cutting torches are inevitably out-of-round or otherwise imperfect. And, because the welding of a tube turn to another structure is a very exacting procedure, any significant imperfection in the edge of a tube turn opening cannot be tolerated. Hence, it has been common in the past to take what were originally very expensive tube turns from a reconstruction site and merely junk them—selling them for only the weight of scrap steel that they contain.

Because tube turns—and especially tube turns which encompass a full 90 degrees—constitute a substantial investment in manufacturing costs, it would be highly desirable to be able to salvage such tube turns and reuse them. To reuse tube turns would dictate that there first be some way to refinish te openings thereof, so that smooth and properly beveled edges are provided to abut against some new structure. And, to achieve symmetrical openings requires that there be some way to properly locate the center of a given opening. Unfortunately, the relatively short distance in which a tube turn is *linear* near its openings has precluded the use of most externally supported cutters, such as the cutter shown in U.S. Pat. No. 3,409,282 to Livers. In practice, then, it has been very difficult to accurately position and reorient a tube turn after it has left the factory where it was made. That is, without the benefit of precisely located jigs, fixtures and reference planes in a factory, there has been no practical way to easily position a tube turn with respect to a cutting apparatus so that its openings might be refinished with the accuracy that is demanded of such products. And, the possibility of returning tube turns to the factory where they were made has been shown to be economically impractical. Hence, there has existed for a long time the need for a technique to easily reclaim used or damaged tube turns in the field. Further, there has existed a need for an apparatus which is capable of refinishing the circular openings of tube turns in a controlled plane so that they can be reused instead of being melted down for scrap. Accordingly, it is an object of this invention to provide a method of reclaiming used or damaged tube turns, and rendering them equivalent to new tube turns having correctly oriented openings.

It is a further object to provide an apparatus which is sufficiently portable that it can be carried to a construction site for immediate use as soon as the need arises.

It is another object of this invention to provide a simplified apparatus which is capable of guiding a cutting torch so as to produce essentially any desired bevel on the opening of a tube turn.

Another object is to provide an apparatus for field use which does not rely on the *exterior* surface of a salvaged tube turn in order to re-establish a desired opening in a specific plane.

Still another object is to provide a method for quickly and reliably locating the opening of a tube turn with respect to a known axis, whereby the edge of that opening may be treated in a desired fashion.

A further object of the invention is to provide a technique for insuring that the respective planes of the two openings in a 90° tube turn are exactly perpendicular to each other.

One more object is to provide a compact apparatus for both positioning a tube turn at a desired location and for accomplishing a flame-cutting operation on the exposed end of said tube turn—without any risk of damage to the positioning means as a result of operation of the flame-cutting means.

It is a further object to provide a mobile piece of equipment which is capable of being transported to a relatively remote construction site, so that any damaged tube turns might be repaired at the construction site instead of being returned to a staging yard.

These and other objects will be apparent from the specification and claims appended thereto, and the drawing provided herewith in which:

FIG. 3 is a front elevational view of the apparatus shown in FIG. 1, looking directly into the opening which is to be refinished;

FIG. 6 is a fragmentary cross-sectional view of one embodiment of an upright post for supporting the circular track at a selected elevation;

FIG. 7 is a side elevational view of a mechanism which is useful in centering a given tube turn with respect to a cutting apparatus;

FIG. 8 is a side elevational view similar to FIG. 7, with relatively short arms (for mating with small diameter openings) being illustrated instead of the longer arms shown in FIG. 7;

FIG. 9 is a side elevational view showing an installed tube turn as it is being maneuvered toward a fixed structure which is adapted to support a cutting torch or the like;

Figure 15:
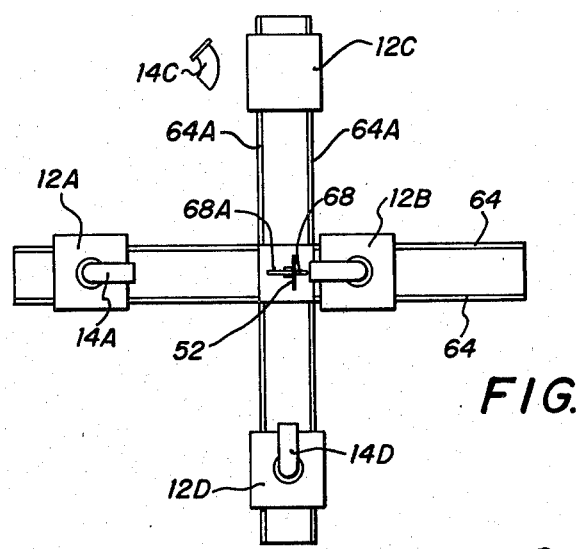
Figure 16:
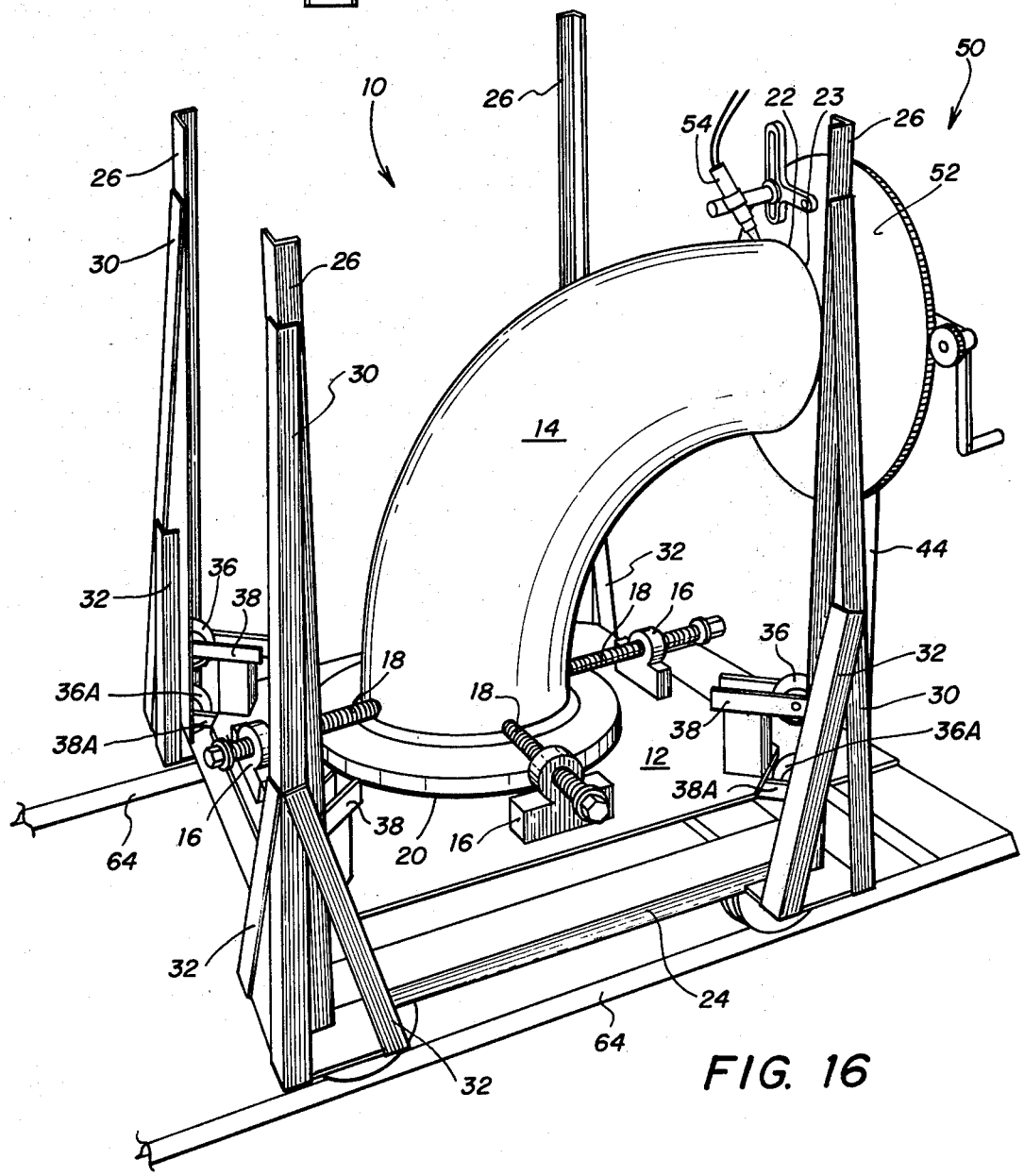

FIG. 15 is a schematic illustration of a two-track, four-carriage apparatus which more nearly insures that the cutting apparatus will never remain idle while a work crew is loading or unloading one of the tube turns; and FIG. 16 is a perspective view of a preferred embodiment of the invention, showing a mounted tube turn in close proximity to an apparatus for refinishing the exposed opening of the tube turn.

In brief, the apparatus disclosed herein includes a movable platform which is adapted to securely hold a tube turn such that a first end of the tube turn is supported in a cantilevered manner, with one of the two circular openings of the tube turn being in a certain plane—typically vertical. A circular track is also provided in a vertical plane, with the track being positionable so as to support a cutting torch for rotative movement around the circular track in a plane that is near and parallel to the cantilevered end of the tube turn. A means such as an expanding "spider" is provided for insuring that the cantilevered end of the tube turn is exactly centered with respect to the circular track. One manner in which this is efficaciously accomplished is to provide a hydraulic jack on the movable platform, with the jack being operable to raise or lower the tube turn with respect to the fixed track. In the preferred embodiment, the centering means for the tube turn is removable from its active location with respect to the tube turn prior to the time that a cutting torch is utilized to re-create a clean opening in the cantilevered end; in this embodiment, the centering means is not contaminated or damaged by a cutting operation. More than one platform may also be used if the cutting apparatus is positionable so as to sequentially face each platform.

Figure 1:
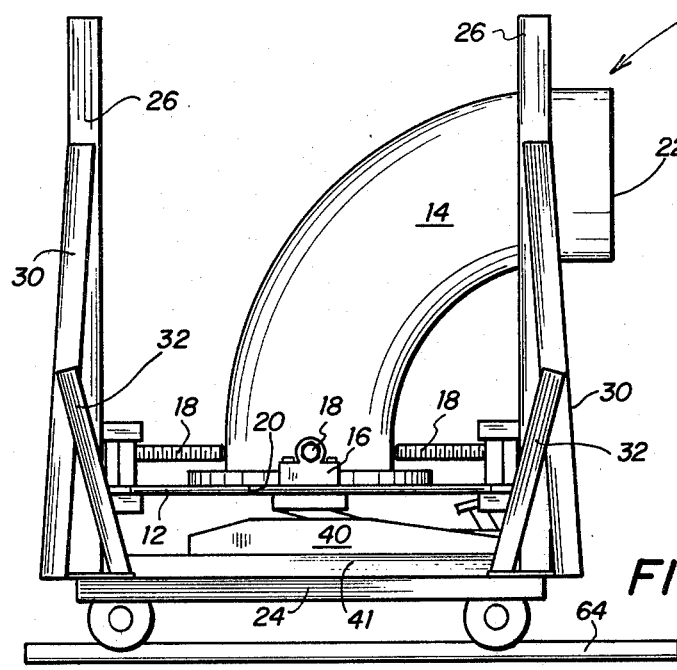
FIG. 1 is a side elevational view of an exemplary tube turn mounted on top of a platform in preparation for refinishing the circular opening which lies in a generally vertical plane.
Figure 2:
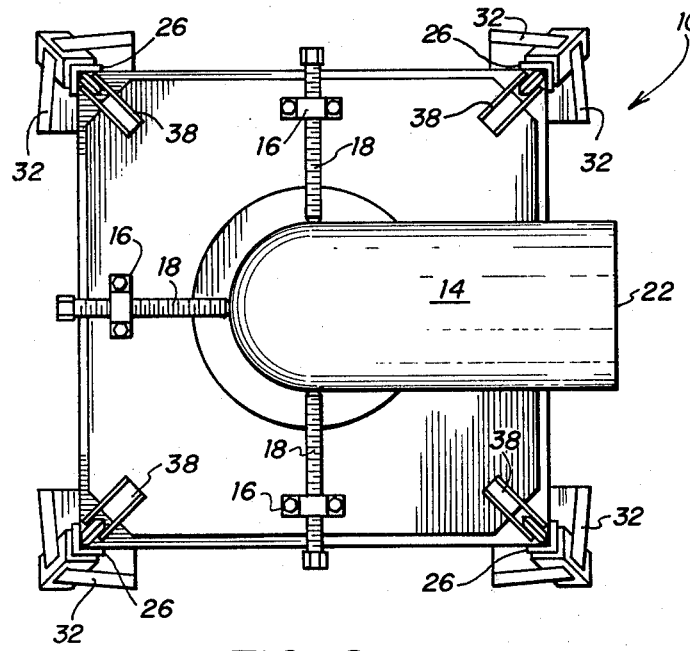
FIG. 2 is a top plan view of the apparatus shown in FIG. 1.

Referring initially to FIGS. 1,2 and 3, the apparatus 10 includes a platform 12 which is adapted to support a tube turn 14 in a rigidly locked position. As shown in this figure, a tube turn having an ID of 12 inches and encompassing a full 90 degrees is represented. Such a tube turn 14 of standard strength will typically weigh about 160 pounds. Hence, the platform 12 must be relatively strong and firmly held. A smooth steel plate having a thickness of about ½ inch has been found to constitute a satisfactorily strong platform 12; and dimensions of about 4 feet by 5 feet have been found to provide adequate space. The specific tube turn 14 which is illustrated is only one of a variety of tube turns which a truly versatile apparatus 10 should be able to accommodate. Because of the great diversity in sizes of such tube turns, it has been found to be advantageous to provide a relatively large area on top of the platform 12 for receiving a given tube turn.

To securely hold a given tube turn to the platform 12, a plurality of fixed threaded members (such as nuts) 16 are arranged peripherally around the platform and secured thereto so that the longitudinal axis of the threaded portions intersect one another in the center of the platform. Typically, there are four threaded nuts 16 fixed to the top of the platform 12; they are elevated approximately 3 inches above the platform and positioned approximately 90 degrees apart with respect to the center of the platform. Heavy duty bolts 18, preferably having a diameter of about 1 inch and a length of about 15 inches have threads which match the threads on the nuts 16. A shaped head is provided on each bolt 18, so that it might be turned in order to promote the tight gripping of a tube turn 14 on top of the platform. As shown in FIG. 1, the tube turn 14 has an integral flange in its first end 20, and this can perhaps more readily insure that the tube turn is stable and not likely to be overturned. But, even if there is not a flange on a given tube turn, the gripping action which is possible with four widely spaced bolts 18 permits essentially any tube turn to be adequately held in place while work is being done on it.

The tube turn 14 is shown in a typical position wherein its second end 22 is supported in a cantilevered manner, and the circular opening 23 is in approximately a vertical plane. If the platform 22 is positioned so as to be exactly horizontal, then a vertical member placed adjacent the second end 22 can be used to evaluate the relative inclination between the two openings of the tube turn 14, i.e., are the two openings exactly perpendicular, or are they possibly inclined in/out or right-/left? If the second end 22 does not lie in a vertical plane after its first end 20 has been secured to a horizontal plane, the apparatus 10 will permit said second end 22 to be cleaned up or otherwise cut or ground in order to achieve a properly oriented opening.

Because of the variety of sizes and shapes in which salvaged tube turns may be initially received at a work station, it is important that the platform 12 be capable of a vertical adjustment with respect to the part of the apparatus 10 which carries a cutting or grinding device. That is, it is desirable that a horizontal platform 12 be movable vertically with respect to a cutting apparatus in order to accommodate tube turns that are, say, one foot high, four feet high, or any size therebetween. In a typical embodiment, the cutting apparatus is generally confined to a particular range of elevations while the platform 12 has a substantial degree of freedom in a vertical direction. One means for elevating the platform 12 consists of a generally rectangular base 24 and four upright posts 26, with one post being at each corner of the generally rectangular base. A guiding apparatus 28 (FIG. 4) is also securely fixed to each corner of the platform 12—for permitting the platform to be raised or lowered while being guided by the four posts 26. To reinforce the upright posts 26, a variety of reinforcing members such as angle-iron members 30, 32 are welded to the upright posts on the outer (or exterior) side, so as to prevent a given post 26 from flexing outwardly.

Figure 4:
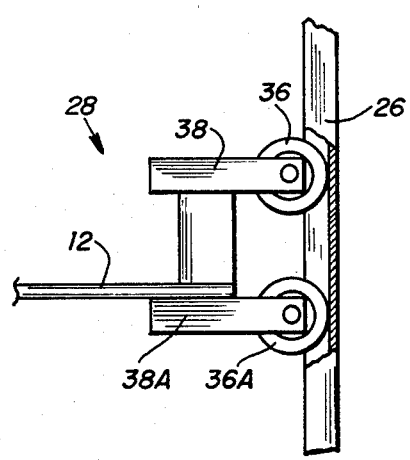
FIG. 4 is a fragmentary side view of one corner of the platform, showing an apparatus for suitably guiding and holding the platform stable—even when it is being elevated or moved.

Referring specifically to FIG. 4, a detailed showing of the preferred means for guiding the platform 12 (as it is raised or lowered) is shown. This means includes a pair of rollers 36, 36A which are mounted one above the other on two parallel arms 38 that are securely fixed to the platform 12. The peripheral faces of these rollers 36, 36A are configured so as to match the shape of an upright post 26. Thus, if a post 26 has the configuration of a piece of conventional angle iron (i.e., the included angle between its two legs is 90 degrees), then the peripheral face of a roller may be somewhat less than 90 degrees and still be securely held interiorly of a given post 26. If the corner post is made from a pipe or heavy tube, then the rollers which bear against the periphery of that post would naturally have a concave face. Perhaps it should be mentioned, too, that two vertically spaced rollers 36, 36A are provided instead of a single roller in order that the platform 12 cannot possibly become vertically skewed with respect to the four posts 26 when the elevation of the platform 12 is being changed. To more nearly insure that the platform 12 does not tilt or become skewed, it is believed that the centers of the rollers 36, 36A should be at least eight inches apart.

In view of the fact that one object of the invention is to provide a device which can be used in a remote location (for example, a construction site where a pipeline or the like is being laid through the middle of some swamp, etc.), it is highly advantageous for an elevating device for the platform to be of simple construction—in order to foster quick repair and/or substitution of a replacement device. To this end, the apparatus 10 is designed to operate with a commercially available hydraulic jack 40 (sometimes called a "floor jack") of the type commonly found in many auto service stations and garages. To receive and support such a hydraulic jack 40, a U-shaped channel 41 is welded to the top of a horizontal base 24 with an upward orientation. The channel 41 is preferably centered with respect to the rectangular platform 12, in order that lifting loads applied to the platform by the jack 40 will be applied in an area where the weight of a tube turn can be said to be concentrated. Such a jack 40 ideally has a capacity to lift at least ½ ton, so that the combined weight of the platform 12 and any anticipated tube turn can be easily lifted in order to position the cantilevered end of the tube turn at a desired elevation.

Figure 5:
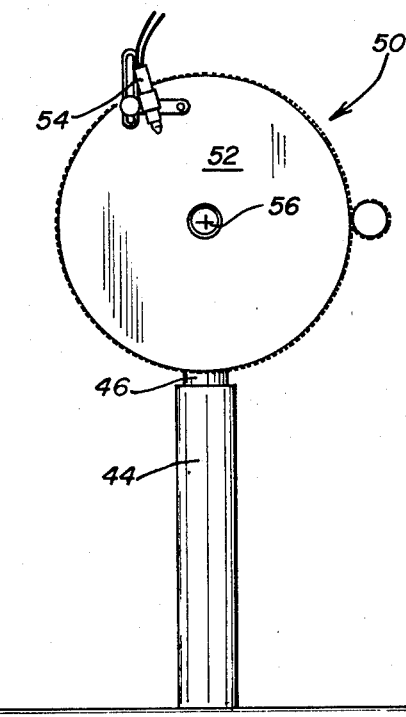
FIG. 5 is a front elevational view of an apparatus for guiding a cutting torch or the like around the circular opening of a tube turn—for refinishing the same.

Turning next to FIG. 5 the cutting apparatus 50 includes a circular track 52 which is positionable to support a cutting torch 54 for rotative movement around the periphery of the track in a plane that is both near and parallel to the cantilevered end 22 of the tube turn. The cutting torch 54 may be any of a variety of cutting torches that are commercially available, such as the torches represented in U.S. Pat. Nos. 2,848,215 to Pendergrass, 2,652,243 to Reed or 2,878,010 to Cink. Because the cutting torch, per se, forms no part of the subject matter of this invention, it need not be further defined. However, it will be readily apparent that the torch 54 can be made to travel in a circular cutting path about a horizontal axis 56. Hence, if the tube turn 14 is positioned in accordance with this invention so that the center of opening 23 is made to coincide with horizontal axis 56, and if opening 23 is reasonably close to circular track 52, then a precisely oriented and fresh edge may be produced on tube turn 14 when the cutting torch 54 makes an excursion around track 52.

In the alternate embodiment shown in FIG. 6 the horizontal platform 12 may be fixed at a certain elevation and the track 52 may be selectively raised or lowered in order to achieve the desired vertical relationship between a tube turn opening 23 and the center of track 52. In such an embodiment, a central supporting post 44, preferably round, telescopes over a tube 46. Hydraulic means similar to an automobile jack may be employed in order to control the elevation of post 46 and the attached track 52. If it is desired to fixedly secure the post 44 with respect to supporting tube 46, a horizontal pin 48 which extends through aligned apertures in the post and tube may be used to effectively lock the two together. A variety of appertures in the external post 44 may be employed in order to lock the post 46 at any of several elevations and/or orientations.

To accomplish the necessary centering of the circular track 52, there must be both some apparatus for physically moving the two elements with respect to each other, and measuring their relative position so that it is known when the two are correctly aligned. A preferred alignment means includes a "spider" 60, two embodiments of which are shown in FIGS. 7 and 8; the spider is adapted for making contact with the interior surface of the circular opening at cantilevered end 22. The embodiment shown in FIG. 7 has relatively long "arms" or "legs" 62, while the embodiment shown in FIG. 8 has short arms 62A—for use in locating the centers of small diameter tube turns. Ideally, each set of arms for a spider has at least three arms that are mounted 120 degrees apart; but four arms separated by 90 degrees would also permit ready determination of the spatial relationship between the tube turn and the track 52.

When working with used tubing of a wide variety of shapes and sizes, and when working without the benefit of precisely located reference points in some factory, it is mandatory that there be two major features in an apparatus of the type described herein. First, there must be a means for centering the exposed end of a tube turn with respect to a circular track, and there must be some means for selectively moving the entire tube turn to and from a cutting location. The aforementioned spider 60, together with the hydraulic jack 40 and the posts 26 which restrain the platform 12 as it is being lifted by the jack, all serve to position the tube turn so that it has an opening that is centered with respect to circular track 52. However, if a person should attempt to begin a cutting operation immediately after the tube turn has been suitably positioned, it is likely that the spider 60 would soon be damaged by either the cutting torch 54 or the waste products which are created by use of the cutting torch. Hence, it is essentially mandatory that there be some way to protect the alignment means (including a spider 60) from any deleterious effects of a cutting operation. In accordance with this invention, such protection is accomplished by mounting the base 24 on elongated rails 64 that permit the base (and the attached platform 12, etc.) to be translated to and from the circular track 52 without changing its elevation. When a tube turn is mounted above base 24 and brought close to the circular track 52, the spider 60 may be temporarily mounted on a stub shaft 68 which is fixed to the circular track at the center thereof; the stub shaft is preferably about 2 inches in diameter and about 24 inches long, and extends in a direction toward the tube turn. The tube 61 which forms the central support for the spider 60 has an inner diameter which provides a slip fit with regard to the stub shaft 68. By adjusting the radial length of the multiple legs of spider 60 so that they are almost in contact with the interior surface of end 22, the operator can readily see whether the plaftform 12 should be raised or lowered in order to properly position the tube turn vertically, and whether opposing bolts 18 should be adjusted in order to correctly position the tube turn in a horizontal direction. As the alignment between the second end 22 becomes more nearly correct with respect to the spider 60, the base 24 can be brought closer to the spider in order that the widely separated contact elements 70 on the spider will make simultaneous contact with the interior wall of circular opening 23. The accomplishment of this alignment is represented in FIG. 9. Another manner of achieving the desired alignment includes a single arm that rotates a full 360° about the axis of the stub shaft 68. The same kind of maneuvering and evaluation can be accomplished with a single arm, but a multiple-arm centering device is normally much faster to use.

Figure 10:
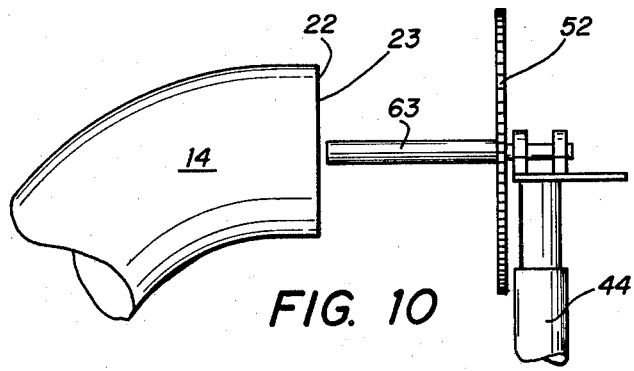
FIG. 10 is a side elevational view of the refinishing apparatus and specifically showing the replacement of the centering spider with a protective sleeve.
Figure 11:
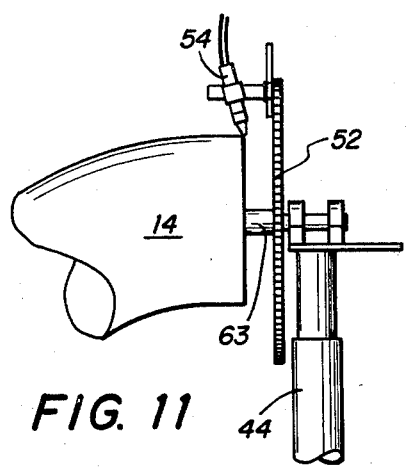
FIG. 11 is a side elevational view of the apparatus showing the cutting torch in an operative position.

Having once achieved this ideal spatial relationship between the tube turn opening 23 and the circular track 52, the base 24 may be translated along rails 64 away from the circular track without fear of "losing" any critical orientation. During the time that the base 24 has been pulled back away from the track 52, there is ample opportunity for a worker to grasp the spider 60 and slide it axially off of stub shaft 68. To protect the surface finish of stub shaft 68 during any subsequent cutting or grinding operations, it is advantageous to place thereon a protective tube 63 which has the same ID as tube 61, but which may otherwise be of most any shape or quality—as long as it can withstand the hot metal waste products that are produced by use of a cutting torch. This step of the procedure is illustrated in FIG. 10. After the stub shaft 68 has been protected by installing protective tube 63, the base 24 may be guided back along parallel rails 64 in order to again bring it into close proximity to circular track 52. A cutting torch 54 may then be adjusted to a desired angle with respect to cantilevered end 22, and then caused to translate around the circular track 52 so as to define a circular cutting path. In this manner, at least some material may be cut off the end of the tube turn and a fresh edge may be produced thereon, with the fresh edge being in a plane that is parallel to the circular track 52 and therefore perpendicular to the plane of base 12 and the other end 20. This is illustrated in FIG. 11. Immediately after the cutting torch is utilized, or at any convenient time thereafter, a grinding apparatus may also be employed to smooth the freshly cut edge, or to provide a compound bevel or the like. The same circular cutting track 52 which supports the cutting torch can be used to support the grinding apparatus.

Figure 12:
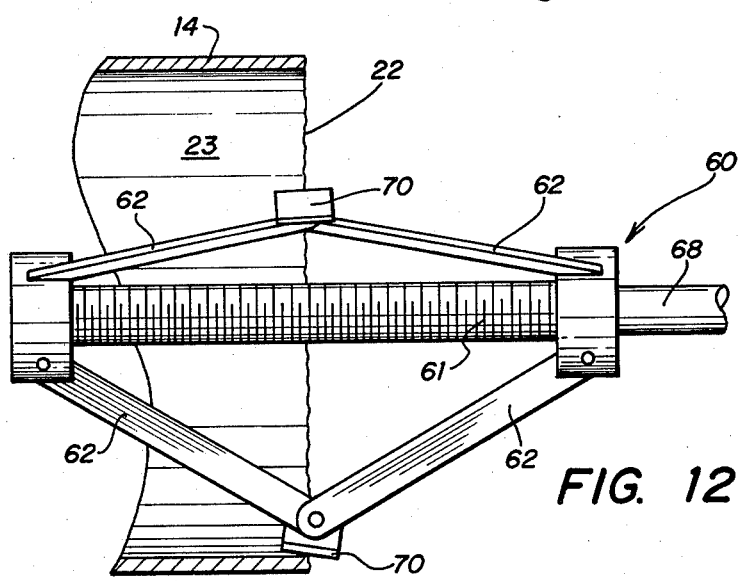
FIG. 12 is a fragmentary cross-sectional view of a spider which is exactly centered with respect to the exposed opening of a tube turn.

Upon completion of the desired cutting, grinding, etc. on the second end 22, the first end 20 could also be refinished—by following a similar procedure of locking second end 22 so that it is flush with the horizontal platform 12, with first end 20 extending in a cantilevered fashion toward the circular track 52. Thus, if the tube turn which is to be refinished had been so roughly cut at both of its ends that there was no true planar surface to begin with, then the first cut made by the cutting torch would establish a smooth edge on the tube turn in a vertical plane. And, when that tube turn was reversed (such that its first and second ends changed position), the second cut would automatically be established at an exact 90 degrees with respect to the first cut. It should be appreciated, too, that the *exterior* condition of a particular tube turn is of no real consequence to using the preferred embodiment of the invention, and, the tube turn may have dents or irregular insulation or other imperfections in its outer surface—without affecting the accuracy of any freshly cut edges. As shown in FIG. 12, only a very short section of the end of a tube turn is needed to accurately center any opening 23 with respect to shaft 68. To this extent, the apparatus disclosed herein is a substantial improvement over devices such as that shown in U.S. Pat. No. 3,417,980 to Greene—which relies on exterior saddles in order to position a cutting torch at some approximate location. In other words, a beveling apparatus which relies on *external* contact with a tube turn to achieve accurate positioning of a cutting torch has utility when the tube turns are new and have unblemished exterior surfaces; but to the degree that those exterior surfaces become less than perfect, they lose their efficacy as a reference point for cutting precise openings.

Figure 13:
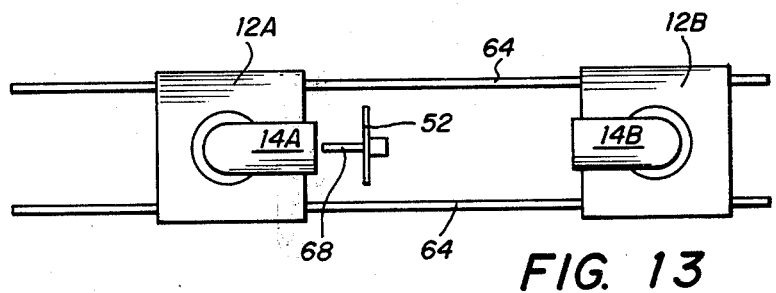
FIG. 13 is a top plan view of a double-ended apparatus according to this invention, in which two platforms are provided and a reversible cutting apparatus is centrally positioned so that it may face either one of the two platforms.
Figure 14:
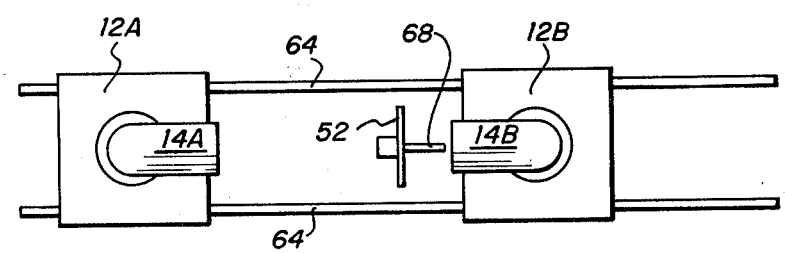
FIG. 14 is a top plan view similar to FIG. 13, in which a first platform has been moved away from a cutting position to an unloading position, and the second platform has been moved from its loading position to a cutting position.

As a practical matter, the weight and size of a typical tube turn and the labor that is required to securely mount such an article on top of a platform 12 often consumes more time than is required to accurately center a tube opening and cut off any irregular edge on said opening. Accordingly, it is sometimes advantageous to provide what may be categorized as a "double-ended" apparatus, including a set of rails for *two* movable platforms; the circular track 52 is then mounted so that it is centered (longitudinally) between the two ends of the rails. Such an arrangement is shown in FIG. 13, with a first carriage 12A being in an operating position for cutting a fresh edge on its mounted tube turn. At the same time, the other carriage 12B is well removed from the cutting area, and a second tube turn is being installed on top of the second carriage. After the first cut has been completed, a locking pin which holds cylindrical post 44 fixed with respect to the base is temporarily removed, and the post is rotated 180 degrees about a vertical axis before the pin is re-inserted. The stub shaft 68 will then be pointing toward the second carriage 12B, and the spider 60 can be re-installed in order to correctly position the new tube turn while the just-completed tube turn is being removed from the first carriage at the other end of the apparatus. Such an arrangement can approximately double the output of a single-ended apparatus 10.

A further modification of the basic single-ended apparatus involves two perpendicular sets of rails or tracks 64, 64A, with provision to lock the upright post and track 52 in any of four directions which are respectively separated by 90 degrees. Such an arrangement is shown schematically in FIG. 15. Of course, in such an embodiment there would be four carriages, one central post supporting one circular track 52, and at least one stub shaft. A second stub shaft, coaxial with the first and extending from the "back" side of circular track 52, could be provided if desired. This is so because the centering function of the spider 60 is intimately involved with only the *center* of the circular track, not the periphery thereof. It is therefore feasible to have a cutting torch moving around the circular track 52 and cutting a first tube turn while another tube turn is being positioned on the "back" side of the track.

While only the preferred embodiment of the invention, and a few alternative embodiments, have been described in great detail herein, it should be apparent to those skilled in the art that other modifications could be made without departing from the spirit of the invention. For example, the platform on which tube turns are mounted could be essentially fixed in one spot and the cutting torch and its associated hardware could be placed on a movable carriage—in contrast to the arrangement shown in FIG. 9. What is important, of course, is that some means be provided for bringing the two devices toward one another at selected times, and separating them without losing their "basic" spatial arrangement. Accordingly, the invention should be understood to be bounded only by the claims which are appended hereto.

What is claimed is:

1. Apparatus for refinishing the circular openings of relatively large tube turns, comprising:
   (a) a platform adapted to securely hold a tube turn such that a first end is supported in a cantilevered manner and the circular opening of said first end lies in a generally vertical plane;
   (b) a circular track which is positionable to support a cutting torch for rotative movement around the track in a plane that is near and parallel to the cantilevered end of the tube turn, whereby the cutting torch may be caused to operate on the cantilevered end;
   (c) means for centering said circular track with respect to the cantilevered end of the tube turn, and said means being adapted to be positioned with respect to the interior surface of the cantilevered tube end; and
   (d) means for selectively positioning the tube turn with respect to the circular track, such that the tube turn and the circular track may be moved to and from a cutting position.

2. The apparatus as claimed in claim 1 wherein the means for centering the circular track with respect to the tube turn includes hydraulic means for elevating the platform with respect to a fixed circular track.

3. The apparatus as claimed in claim 1 wherein the means for selectively positioning the tube turn with respect to the circular track includes a fixed base and means for causing the platform to translate with respect to the base in a direction that is toward and away from the circular track.

4. The apparatus as claimed in claim 3 wherein the platform is caused to translate with respect to the fixed base by a pair of spaced and parallel rails on said base and a set of wheels which are mounted on the platform at such a location as to engage the parallel rails.

5. The apparatus as claimed in claim 1 wherein the means for centering said circular track with respect to the cantilevered end of the tube turn includes a stub shaft which is fixed to the circular track at the center thereof and extending in a direction towards the tube turn.

6. The apparatus as claimed in claim 1 wherein the means for centering said circular track with respect to the cantilevered end of the tube turn includes a spider having arms which are adapted to interiorly engage the circular opening of the cantilevered end of the tube turn.

7. The apparatus as claimed in claim 6 wherein a first spider is replaceable at will with a differently sized spider, whereby the apparatus may accomodate tube turns of a wide variety of sizes including tube turns as having openings as small as 2 inches and as large as 30 inches.

8. The apparatus as claimed in claim 1 wherein the platform is vertically movable with respect to a set of four upright posts, with one of the posts being at each of the respective four corners of the rectangular platform.

9. The apparatus as claimed in claim 1 and further including a second platform which is adapted to securely hold a tube turn in the same manner as the first platform, and the circular track being mounted between the two platforms, and the circular track being rotatable about a vertical axis through an angle of at least 180 degrees, whereby the circular track may be oriented to face either one of the platforms at will.

10. The apparatus as claimed in claim 1 wherein the circular track is essentially centered between a plurality of platforms, each of which platforms is adapted to individually hold a respective tube turn, and the platforms being selectively movable from a cutting position immediately adjacent the circular track to a loading position which is well removed from the circular track.

* * * * *